US006808857B2

(12) United States Patent
Miyamoto et al.

(10) Patent No.: US 6,808,857 B2
(45) Date of Patent: Oct. 26, 2004

(54) NEGATIVE-WORKING PHOTOSENSITIVE COMPOSITION AND NEGATIVE-WORKING PHOTOSENSITIVE LITHOGRAPHIC PRINTING PLATE

(75) Inventors: Yasushi Miyamoto, Tatebayashi (JP); Eiji Hayakawa, Utsunomiya (JP)

(73) Assignee: Kodak Polychrome Graphics LLC, Norwalk, CT (US)

( * ) Notice: Subject to any disclaimer, the term of this patent is extended or adjusted under 35 U.S.C. 154(b) by 164 days.

(21) Appl. No.: 10/151,199

(22) Filed: May 20, 2002

(65) Prior Publication Data

US 2003/0087177 A1 May 8, 2003

(30) Foreign Application Priority Data

May 21, 2001 (JP) .................................. P2001-150669

(51) Int. Cl.$^7$ ............................. G03F 7/021; G03F 7/30
(52) U.S. Cl. .................. 430/157; 430/176; 430/270.1; 430/302
(58) Field of Search ................ 430/157, 176, 430/270.1, 302

(56) References Cited

U.S. PATENT DOCUMENTS

| | | | |
|---|---|---|---|
| 2,714,066 A | 7/1955 | Jewett et al. ..................... 95/8 |
| 2,946,638 A | 7/1960 | Colo ........................... 312/255 |
| 3,136,636 A | 6/1964 | Dowdal et al. ................ 96/75 |
| 3,181,461 A | 5/1965 | Fromson .................. 101/149.2 |
| 3,201,247 A | 8/1965 | Leonard ........................ 96/75 |
| 3,220,832 A | 11/1965 | Uhlig ............................. 96/1 |
| 3,276,868 A | 10/1966 | Uhlig et al. ................... 96/1.5 |
| 3,307,951 A | 3/1967 | Adams et al. ................. 96/86 |
| 3,396,019 A | 8/1968 | Uhlig et al. ................... 96/33 |
| 3,438,778 A | 4/1969 | Uhlig et al. ................... 96/33 |
| 3,468,725 A | 9/1969 | Uhlig ......................... 148/6.15 |
| 3,658,662 A | 4/1972 | Casson, Jr. et al. ........... 204/58 |
| 3,881,924 A | 5/1975 | Murakami et al. ............. 96/1.6 |
| 4,212,970 A | 7/1980 | Iwasaki ....................... 271/10 |
| 4,239,850 A | 12/1980 | Kita et al. ................... 430/281 |
| 4,283,475 A | 8/1981 | Kawamura et al. ........... 430/70 |
| 4,578,342 A | 3/1986 | Sekiya ....................... 430/159 |
| 4,756,993 A | 7/1988 | Kitatani et al. ............... 430/69 |
| 4,849,051 A | 7/1989 | Ahne et al. ............... 156/659.1 |
| 4,950,582 A | 8/1990 | Aoai et al. .................. 430/175 |
| 5,156,938 A | 10/1992 | Foley et al. ................. 430/200 |
| 5,230,985 A | 7/1993 | Lohaus et al. |
| 6,329,110 B1 * | 12/2001 | Nunomura et al. ........... 430/18 |
| 2003/0082474 A1 | 5/2003 | Haley et al. |
| 2003/0113655 A1 | 6/2003 | Hayakawa et al. |
| 2003/0129526 A1 | 7/2003 | Haley et al. |

FOREIGN PATENT DOCUMENTS

| | | |
|---|---|---|
| EP | 0 458 325 A1 | 11/1991 |
| EP | 0625728 | 11/1994 |
| EP | 0 909 657 A2 | 4/1999 |
| EP | 1 111 465 A1 | 6/2001 |
| GB | 434875 | 9/1935 |
| GB | 1108559 | 4/1968 |
| GB | 1230447 | 5/1971 |
| JP | 57142645 | 4/1982 |
| JP | 58112792 | 7/1983 |
| JP | 58112793 | 7/1983 |
| JP | 58125246 | 7/1983 |
| JP | 58173696 | 10/1983 |
| JP | 58181051 | 10/1983 |
| JP | 58181690 | 10/1983 |
| JP | 58194595 | 11/1983 |
| JP | 58016839 | 12/1983 |
| JP | 58220143 | 12/1983 |
| JP | 58224793 | 12/1983 |
| JP | 58018291 | 1/1984 |
| JP | 5948187 | 3/1984 |
| JP | 5973996 | 4/1984 |
| JP | 5984356 | 5/1984 |
| JP | 59146061 | 8/1984 |
| JP | 59146063 | 8/1984 |
| JP | 59202829 | 11/1984 |
| JP | 59216146 | 12/1984 |
| JP | 6052940 | 3/1985 |
| JP | 6063744 | 4/1985 |
| JP | 60064352 | 4/1985 |
| JP | 6078787 | 5/1985 |
| JP | 6236657 | 2/1987 |
| JP | 6256971 | 3/1987 |
| JP | 6259963 | 3/1987 |
| JP | 62226143 | 9/1987 |
| JP | 63127237 | 5/1988 |
| JP | 2077748 | 3/1990 |
| JP | 6236029 | 8/1994 |
| JP | 8339082 | 12/1996 |

OTHER PUBLICATIONS

Color Index, "Latest Pigment Handbook", (edited by the Japan Association of Pigment Technology, 1777 edition) discloses pigments which can be used in the present invention.

Latest Pigment Application Technologies (CMC, 1986) discloses pigments which can be used in the present invention. It also discloses surface–treating methods which can be used in the present invention.

(List continued on next page.)

*Primary Examiner*—John S. Chu
(74) *Attorney, Agent, or Firm*—Faegre & Benson LLP

(57) ABSTRACT

The present invention provides a negative-working photosensitive composition which can widen the preheat latitude upon exposure without increasing ablation, and a negative-working photosensitive lithographic printing plate. The negative-working photosensitive composition comprises (a) an alkali-soluble resin, (b) a compound capable of being crosslinked by an acid, (c) a compound capable of generating an acid by heat, (d) a photothermal converting agent, and (e) a sulfone compound represented by the following general formula (I).

$$R\text{—}SO_2\text{—}R' \qquad (I)$$

wherein R and R' may be the same or different and represent a substituted or non-substituted alkyl, alkenyl, aryl, or heterocyclic group. The negative-working photosensitive lithographic printing plate comprises a photosensitive layer made of the negative-working photosensitive composition.

20 Claims, No Drawings

OTHER PUBLICATIONS

"Printing Ink Technologies" (CMC, 1984) discloses pigments which can be used in the present invention.

"Carbon Black Handbook, Third Edition" (edited by the Association of Carbon Black, 1995) discloses carbon blacks which can be used in the present invention.

"Characteristics and Optimum Formulation of Carbon Black and application Technique" (edited by the Association of Technical Information, 1997) discloses carbon blacks which can be used in the present invention.

"Properties and Applications and Metal Soaps" (Saiwai Shobo K.K.) discloses dispersing agents and additives which can be used in the present invention.

"Dye Handbook" (edited by the Association of Organic Synthesis Chemistry, published 1970) discloses dyes which can be used in the present invention.

"Handbook of Color Material Engineering" (edited by the Japan Society of Color Material, Asakura Shoten K.K., published 1989) discloses dyes which can be used in the present invention.

"Technologies and Markets of Industrial Pigments" (CMC, published 1983 discloses dyes which can be used in the present invention.

"Chemical Handbook, Applied Chemistry Edition" (Edited by the Chemical Society of Japan, Maruzen Shoten K.K., published 1986) discloses dyes which can be used in the present invention.

* cited by examiner

NEGATIVE-WORKING PHOTOSENSITIVE COMPOSITION AND NEGATIVE-WORKING PHOTOSENSITIVE LITHOGRAPHIC PRINTING PLATE

CROSS-REFERENCE TO RELATED APPLICATIONS

This application claims priority from Japanese patent application number JP2001-150669, which is incorporated herein by reference in its entirety.

BACKGROUND OF THE INVENTION

1. Field of the Invention

The present invention relates to a negative-working photosensitive lithographic printing plate used in the offset printing field and, more particularly, to a negative-working photosensitive lithographic printing plate used as a so-called computer-to-plate (CTP) capable of directly making plates based on a digital signal from a computer, and a negative-working photosensitive composition suited for use in a photosensitive layer of such a lithographic original printing plate. 2. Background Information With the progress of computer image processing techniques, a method of directly writing an image by light irradiation corresponding to a digital signal has recently been developed. An intense interest has been shown towards a computer-to-plate (CTP) system of directly forming an image on a photosensitive lithographic printing plate without outputting to a silver salt mask film by utilizing this system in lithographic printing plates. A CTP system using a high-output laser having a maximum intensity within a near infrared or infrared range as a light source of light irradiation has advantages such that a high-resolution image can be obtained by exposure in a short time and a photosensitive lithographic printing plate used in the system can be handled in a lighted room. Particularly, high-output and small-sized lasers are easily available as solid lasers and semiconductor lasers, which emit infrared rays having a wavelength within a range from 760 to 1200 nm.

As the negative-working photosensitive composition which can form an image using a solid laser or semiconductor laser which is capable of emitting infrared rays, those comprising an alkali-soluble resin (novolak resin, etc.), a compound capable of being crosslinked by an acid (acid-crosslinking agent such as a resol resin), a compound capable of generating an acid by heat (acid-generating agent), and a photothermal converting agent (infrared absorber such as a dye or pigment) are proposed in Japanese Unexamined Patent Application, First Publication No. Hei 7-20629.

In this negative-working photosensitive composition, it is found that a negative-working image is formed in the following manner. First, infrared rays emitted from the solid laser or semiconductor laser are converted into heat by the photothermal converting agent. An acid is generated from the acid-generating agent by the heat. When preheated (heating) prior to development, catalytic action of the acid causes crosslinking. Consequently, a negative-working image is formed.

This photothermal converting agent incorporated into the negative-working photosensitive composition has an action of suppressing dissolution of the alkali-soluble resin, in addition to an action of converting light into heat. Therefore, it has an effect of suppressing the alkali-soluble resin from excessively dissolving upon development, thereby to improving (widening) "preheat latitude" (tolerance of heat treating conditions). Thus, even if a slight variation in treating time or heating temperature of preheating occurs among photosensitive lithographic printing plates to be preheated, the solubility of the alkali-soluble resin upon development is not drastically influenced by the variation and does not vary too much itself.

As described above, widening of the preheat latitude has an advantage such that it becomes unnecessary to strictly control the preheating conditions, and the operability is improved. Also, a further improvement in the preheat latitude is desired.

However, the photothermal converting agent has a problem such that it increases ablation (scattering phenomenon of the photosensitive composition) upon exposure. It is necessary to suppress the ablation because it can cause a stain in the light source such as a solid laser or semiconductor laser.

Therefore, presently, the amount of the photothermal converting agent cannot be increased for the object of widening the preheat latitude.

SUMMARY OF THE INVENTION

Thus, an object of the present invention is to provide a negative-working photosensitive composition which can widen the preheat latitude without increasing ablation upon exposure, and a negative-working photosensitive lithographic printing plate.

To achieve the object described above, the present inventors have made intensive studies and discovered that a specific sulfone compound has an excellent dissolution suppressing effect and does not cause ablation upon exposure, and thus the present invention has been completed.

That is, the negative-working photosensitive composition of the present invention comprises (a) an alkali-soluble resin, (b) a compound capable of being crosslinked by an acid, (c) a compound capable of generating an acid by heat, (d) a photothermal converting agent, and (e) a sulfone compound represented by the following general formula (I):

$$R-SO_2-R' \qquad (I)$$

wherein R and R' may be the same or different and represent a substituted or non-substituted alkyl, alkenyl, aryl, or heterocyclic group.

The negative-working photosensitive lithographic printing plate of the present invention comprises a substrate and a photosensitive layer comprising the negative-working photosensitive composition of the present invention formed on the surface of the substrate.

The negative-working photosensitive composition of the present invention can widen the preheat latitude upon exposure without increasing ablation.

The negative-working photosensitive lithographic printing plate of the present invention suppresses ablation upon exposure to the same level as that of a conventional printing plate and achieves a wide preheat latitude.

DETAILED DESCRIPTION OF THE INVENTION

The present invention will be described in detail below.
Negative-working Photosensitive Composition The alkali-soluble resin (a) refers to a binder resin which is insoluble in water and is soluble in an aqueous alkali solution.

Examples of the alkali-soluble resin (a) include: novolak resins or resol resins, such as phenol-formaldehyde resins, cresol-formaldehyde resins, phenol-cresol-formaldehyde co-condensed resins; polyhydroxystyrene; polyhalogenated hydroxystyrene; acrylic resins containing one or more kinds of monomers having an acidic group, such as N-(4-hydroxyphenyl)methacrylamide, hydroquinone monomethacrylate, N-(sulfamoylphenyl) methacrylamide, N-phenylsulfonylmethacrylamide, N-phenylsulfonylmaleimide, acrylic acid, or methacrylic acid; active methylene group-containing resins as described in Japanese Unexamined Patent Application, First Publication No. Sho 63-127237; vinyl polymer resins such as urea bond-containing resins as described in Japanese Unexamined Patent Application, First Publication No. Hei 8-339082; polyurethane resins having a sulfonylamide group, N-sulfonylureido group or N-aminosulfonylamide group as described in Japanese Unexamined Patent Application, First Publication No. Sho 63-261350; polyurethane resins such as active imide group-containing polyurethane resins as described in Japanese Unexamined Patent Application, First Publication No. Hei 2-77748; polyamide resins such as polyhydroxypolyamide as described in Japanese Unexamined Patent Application, First Publication No. Hei 1-6947; and polyester resins such as polyester resins having a phenolic hydroxyl group as described in Japanese Unexamined Patent Application, First Publication No. Hei 6-236029.

Among these resins, a novolak resin is preferably used because a wide developing tolerance can be obtained.

The amount of the alkali-soluble resin (a) is preferably within a range from 40 to 95% by weight based on the solid content of the negative-working photosensitive composition. If necessary, two or more kinds of alkali-soluble resins (a) may be used in combination.

The compound (b) capable of being crosslinked by an acid is not specifically limited as far as it is crosslinked and made insoluble by catalytic action of an acid generated from the compound (c), which is capable of generating an acid by heat, described below.

Examples of the compound (b) capable of being crosslinked by an acid include an amino compound having at least two substituents such as a methylol group, alkoxymethyl group, or acetoxymethyl group. Specific examples thereof include a melamine derivative such as methoxymethylated melamine, a benzoguanamine derivative or glycol uril derivative, a urea resin derivative, and a resol resin.

Among these compounds, a resol resin is preferably used because the solubility in the developing solution and contrast of the image portion and non-image portion increase.

The amount of the compound (b) capable of being crosslinked by an acid is preferably within a range from 5 to 70% by weight based on the solid content of the negative-working photosensitive composition. If necessary, two or more kinds of compounds (b) capable of being crosslinked by an acid may be used in combination.

Examples of the compound (c) capable of generating an acid by heat include publicly known onium salt such as ammonium salt, phosphonium salt, iodonium salt, sulfonium salt, or selenonium salt, an organohalogen compound, a photo acid generating agent having an o-nitrobenzyl protective group, and a disulfone compound. Among these compounds, a trihaloalkyl compound and a diazonium salt are used particularly preferably because a high sensitivity can be obtained. If necessary, two or more kinds of compounds (c) capable of generating an acid by heat may be used in combination.

Examples of the trihaloalkyl compound include a trihaloemethyl-s-triazine compound as described in U.S. Pat. No. 4,239,850, and an oxadiazole compound and tribromomethylsulfonyl compound as described in U.S. Pat. No. 4,212,970.

Examples of the diazonium salt compound include an organic or inorganic salt of at least one kind of a compound selected from 4-diazodiphenylamine, 4-diazo-3-methyldiphenylamine, 4-diazo-4'-methyldiphenylamine, 4-diazo-3'-methyldiphenylamine, 4-diazo-4'-methoxydiphenylamine, 4-diazo-3-methyl-4'-ethoxydiphenylamine, and 3-diazo-4-methoxydiphenylamine.

Examples of the organic acid include methanesulfonic acid, benzenesulfonic acid, toluenesulfonic acid, xylenesulfonic acid, mesitylenesulfonic acid, dodecylbenzenesulfonic acid, naphthalenesulfonic acid, propylnaphthalenesulfonic acid, 1-naphthol-5-sulfonic acid, 2-nitrobenzenesulfonic acid, 3-chlorobenzenesulfonic acid, 2-hydroxy-4-methoxybenzophenone-5-sulfonic acid, 2,4-dihydroxybenzophenone, benzenephosphinic acid, and trifluoromethanesulfonic acid. Examples of the inorganic compound include hexafluorophosphoric acid, tetrafluoroboric acid, and thiocyanic acid.

The amount of the compound (c) capable of generating an acid by heat is within a range from 0.01 to 50% by weight, and particularly preferably from 0.1 to 20% by weight, based on the solid content of the negative-working photosensitive composition. When the amount of the compound (c) capable of generating an acid by heat is smaller than 0.01% by weight, it is impossible to expect generation of acid sufficient to crosslink the compound (b) which is capable of being crosslinked by an acid. On the other hand, when the amount is larger than 50% by weight, the solubility of the non-image portion in the developing solution is drastically lowered.

The photothermal converting agent (d) is a substance which absorbs light to generate an acid. Examples of such a substance include various pigments or dyes.

The pigments used in the present invention are commercially available pigments, and are described, for example, in Color Index, "Latest Pigment Handbook", (edited by the Japan Association of Pigment Technology, 1977 edition), "Latest Pigment Application Technologies" (CMC, 1986), and "Printing Ink Technologies" (CMC, 1984). Examples of the pigments include black pigments, yellow pigments, orange pigments, brown pigments, red pigments, purple pigments, blue pigments, green pigments, fluorescent pigments, and polymers containing chemically combined dyes. Specific examples of the pigments are insoluble azo pigments, azo lake pigments, condensed azo pigments, chelated azo pigments, phthalocyanine-based pigments, anthraquinone-based pigments, perylene- and perinone-based pigments, thioindigo-based pigments, quinacridone-based pigments, dioxazine-based pigments, isoindolinone-based pigments, quinophthalone-based pigments, dyed lake pigments, azine pigments, nitroso pigments, nitro pigments, natural pigments, fluorescent pigments, inorganic pigments, and carbon black.

Among these pigments, carbon black is preferably used as a substance which absorbs light within a near infrared or infrared range to efficiently generate heat and is economically excellent. As these carbon blacks, grafted carbon blacks, which have various functional groups and are superior in dispersibility, are commercially available and are described on page 167 of "Carbon Black Handbook, Third Edition" (edited by the Association of Carbon Black, 1995) and page 111 of "Characteristics and Optimum Formulation of Carbon Black and Application Technique" (edited by the Association of Technical Information, 1997), and any of these carbon blacks can be preferably used in the present invention.

These pigments may be used without being surface-treated or may be used after being subjected to publicly known surface treatments. Publicly known surface treatments include a treatment wherein a resin or a wax is coated on the surface of the pigments, a treatment wherein a surface active agent is adhered to the surface of the pigments, and a treatment wherein a reactive substance (e.g., a silane coupling agent, an epoxy compound, or a polyisocyanate) is bonded to the surface of the pigments. These surface-treating methods are described in "Properties and Applications of Metal Soaps" (Saiwai Shobo K. K.), "Latest Pigment Application Technologies" (CMC, published 1986), and "Printing Ink Technologies" (CMC, published 1984).

The particle diameter of the pigments used in the present invention is preferably within a range from 0.01 to 15 $\mu$m, and more preferably from 0.01 to 5 $\mu$m.

The dyes used in the present invention are commercially available dyes and known dyes described, for example, in "Dye Handbook" (edited by the Association of Organic Synthesis Chemistry, published 1970), "Handbook of Color Material Engineering" (edited by the Japan Society of Color Material, Asakura Shoten K. K., published 1989), "Technologies and Markets of Industrial Pigments" (CMC, published 1983), and "Chemical Handbook, Applied Chemistry Edition" (edited by The Chemical Society of Japan, Maruzen Shoten K. K., published 1986). Specific examples of the dyes include azo dyes, azo dyes in the form of metal complex salts, pyrazolone azo dyes, anthraquinone dyes, phthalocyanine dyes, carbonium dyes, quinonimine dyes, methine dyes, cyanine dyes, indigo dyes, quinoline dyes, nitro-based dyes, xanthene dyes, thiazine-based dyes, azine dyes, and oxazine dyes. Among these dyes, those which absorb light within a near infrared or infrared range are particularly preferred.

The dyes which absorb light within a near infrared or infrared range are, for example, cyanine dyes as described in Japanese Unexamined Patent Application, First Publication No. Sho 58-125246, Japanese Unexamined Patent Application, First Publication No. Sho 59-84356, Japanese Unexamined Patent Application, First Publication No. Sho 59-202829, and Japanese Unexamined Patent Application, First Publication No. Sho 60-78787; methine dyes as described in Japanese Unexamined Patent Application, First Publication No. Sho 58-173696, Japanese Unexamined Patent Application, First Publication No. Sho 58-181690, and Japanese Unexamined Patent Application, First Publication No. Sho 58-194595; naphthloquinone dyes as described in Japanese Unexamined Patent Application, First Publication No. Sho 58-112793, Japanese Unexamined Patent Application, First Publication No. Sho 58-224793, Japanese Unexamined Patent Application, First Publication No. Sho 59-48187, Japanese Unexamined Patent Application, First Publication No. Sho 59-73996, Japanese Unexamined Patent Application, First Publication No. Sho 60-52940, and Japanese Unexamined Patent Application, First Publication No. Sho 60-63744; squarilium pigments as described in Japanese Unexamined Patent Application, First Publication No. Sho 58-112792; cyanine dyes as described in British Patent No. 434875; and infrared absorbers as described in U.S. Pat. No. 5,156,938. The dyes further include substituted arylbenzo(thio)pyridinium salts as described in U.S. Pat. No. 3,881,924; trimethinethiapyrylium salts as described in Japanese Unexamined Patent Application, First Publication No. Sho 57-142645; pyrylium-based compound as described in Japanese Unexamined Patent Application, First Publication No. Sho 58-181051, Japanese Unexamined Patent Application, First Publication No. Sho 58-220143, Japanese Unexamined Patent Application, First Publication No. Sho 59-146063, and Japanese Unexamined Patent Application, First Publication No. Sho 59-146061; cyanine pigments as described in Japanese Unexamined Patent Application, First Publication No. Sho 59-216146; pentamethinethiopyrylium salts as described in U.S. Pat. No. 4,283,475; pyrylium compounds as described in Japanese Examined Patent Application, Second Publication No. Hei 5-13514 and Japanese Examined Patent Application, Second Publication No. Hei 5-19702; and infrared absorbing dyes as described in U.S. Pat. No. 4,756,993.

The photothermal converting agent (d) is a substance which absorbs light to generate heat. Examples of such a substance include various pigments or dyes.

When using a pigment as the photothermal converting agent (d), the amount of the pigment is preferably within a range from 1 to 70% by weight, and particularly preferably from 3 to 50% by weight, based on the total solid content of the negative-working photosensitive composition. When the amount of the pigment is less than 1% by weight based on the total solid content, a sufficient quantity of heat cannot be obtained even if heat is generated by absorbing light. On the other hand, when the amount is more than 70% by weight, the quantity of heat tends to be too large. Therefore, it is not preferred.

When using a dye as the photothermal converting agent (d), the amount of the dye is preferably within a range from 0.1 to 30% by weight, and particularly preferably from 0.5 to 20% by weigh based on the total solid content of the negative-working photosensitive composition. When the amount of the dye is less than 0.1% by weight based on the total solid content, sufficient quantity of heat cannot be obtained even if heat is generated by absorbing light. On the other hand, when the amount is more than 30% by weight, the quantity of heat does not substantially increase any further, and the addition of the photothermal converting agent (d) is no longer effective. Therefore, it is not preferred.

The sulfone compound (e) represented by the following general formula (I) serves as a dissolution inhibitor of the alkali-soluble resin (a) and does not cause ablation upon exposure.

$$R-SO_2-R' \qquad (I)$$

wherein R and R' may be the same or different and represent a substituted or non-substituted alkyl, alkenyl, aryl, or heterocyclic group.

Specific examples of the sulfone compound (e) represented by the general formula (I) include diphenyl sulfone, dixylyl sulfone, 4,4'-dichlorodiphenyl sulfone, di-n-butyl sulfone, and 2-pyridyltribromomethyl sulfone.

Among these sulfone compounds, a sulfone compound of the above general formula (I) wherein R and R' represent an aryl group is preferred in view of the effect of suppressing the dissolution of the alkali-soluble resin (a) in the developing solution, and diphenylsulfone is particularly preferred. If necessary, two or more kinds of sulfone compounds (e) represented by the general formula (I) may be used in combination.

The amount of the sulfone compound (e) represented by the general formula (I) is preferably within a range from 0.01 to 50% by weight, and particularly preferably from 0.5 to 20% by weight, based on the solid content of the negative-working photosensitive composition. When the amount of the sulfone compound is less than 0.01% by weight, an improvement in the action of suppressing the dissolution of the alkali-soluble resin (a) cannot be sufficiently expected. On the other hand, when the amount is more than 50% by weight, the solubility of the non-image portion to the developing solution is drastically lowered.

If necessary, publicly known additives such as color materials (dyes, pigments), surfactants, plasticizers and stability modifiers can be added to the negative-working photosensitive composition of the present invention.

Examples of preferred dyes include basic oil-soluble dyes such as Crystal Violet, Malachite Green, Victoria Blue, Methylene Blue, Ethyl Violet, and Rhodamine B. Examples of commercially available products thereof include "Victoria Pure Blue BOH" (manufactured by Hodogaya Chemical Co., Ltd.), "Oil Blue #603" (manufactured by Orient Chemical Industries, Ltd.), and "VPB-Naps (naphthalenesulfonate of Victoria Pure Blue)" (manufactured by Hodogaya Chemical Co., Ltd.). Examples of the pigments include Phthalocyanine Blue, Phthalocyanine Green, Dioxazine Violet, and Quinacridone Red.

Examples of the surfactants include fluorine-based surfactants and silicone-based surfactants as described in Japanese Unexamined Patent Application, First Publication No. Sho 62-36657 and Japanese Unexamined Patent Application, First Publication No. Sho 62-226143.

Examples of the plasticizers include diethyl phthalate, dibutyl phthalate, dioctyl phthalate, tributyl phosphate, trioctyl phosphate, tricresyl phosphate, tri(2-chloroethyl) phosphate, and tributyl acetate.

As the publicly known stability modifiers, for example, phosphoric acid, phosphorous acid, oxalic acid, tartaric acid, malic acid, citric acid, dipicolinic acid, polyacrylic acid, benzenesulfonic acid and toluenesulfonic acid can also be used in combination.

The amounts of these additives varies depending on the purposes, but are preferably within a range from 0 to 30% by weight based on the solid content of the photosensitive composition.

Negative-working Photosensitive Lithographic Printing Plate

The negative-working photosensitive lithographic printing plate of the present invention is generally composed of a substrate and a photosensitive layer made of the above negative-working photosensitive composition formed on the substrate.

The photosensitive layer may be referred to as a heat-sensitive layer because heat generated by light-irradiation is utilized, but may be referred to as a photosensitive layer for the sake of convenience.

Examples of the substrate include metal sheets made of aluminum, zinc, copper, stainless steel, and iron; plastic films made of polyethylene terephthalate, polycarbonate, polyvinyl acetal, and polyethylene; papers melt-coated or coated with a synthetic resin, and composite materials obtained by forming a metal layer on a plastic film by a technique such as vacuum deposition or laminating; and materials used as the substrate of the printing plate. Among these substrates, aluminum and a composite substrate coated with aluminum are preferably used.

The surface of the aluminum substrate is preferably surface-treated for the purpose of improving adhesion with the photosensitive layer by enhancing the water retentivity. Examples of the surface treatment include roughening methods such as a brush polishing method, ball polishing method, electrolytic etching method, chemical etching method, liquid honing polishing method, sand blasting method, and combinations thereof. Among these methods, a roughening treatment including the use of electrolytic etching is preferred.

The electrolytic bath used in electrolytic etching contains an aqueous solution containing an acid, an alkali or a salt thereof, or an aqueous solution containing an organic solvent. Among these solutions, an electrolytic solution containing hydrochloric acid, nitric acid, or a salt thereof is particularly preferred.

The roughened aluminum substrate is optionally subjected to a desmutting treatment using an aqueous solution of an acid or alkali. The aluminum substrate thus obtained is preferably anodized. It is particularly preferred to anodize in a bath containing sulfuric acid or phosphoric acid.

If necessary, the aluminum substrate can be treated with a silicate (sodium silicate, potassium silicate) as described in U.S. Pat. No. 2,714,066 and U.S. Pat. No. 3,181,461, treated with a potassium zirconate fluoride as described in U.S. Pat. No. 2,946,638, treated with phosphomolybdate as described in U.S. Pat. No. 3,201,247, treated with alkyl titanate as described in British Patent No. 1108559, treated with polyacrylic acid as described in German Patent No. 1,091,433, treated with polyvinylsulfonic acid as described in German Patent No. 1,134,093 and British Patent No. 1230447, treated with phosphonic acid as described in Japanese Examined Patent Application, Second Publication No. Sho 44-6409, treated with phytic acid as described in U.S. Pat. No. 3,307,951, treated with a salt of a hydrophilic organic polymer compound and a divalent metal as described in Japanese Unexamined Patent Application, First Publication No. Sho 58-16839 and Japanese Unexamined Patent Application, First Publication No. Sho 58-18291, treated by undercoating with a water-soluble polymer having a sulfonic acid group as described in Japanese Unexamined Patent Application, First Publication No. Sho 59-101651, treated with an acidic dye as described in Japanese Unexamined Patent Application, First Publication No. Sho 60-64352, or treated by electrodeposition with silicate as described in U.S. Pat. No. 3,658,662.

Also an aluminum substrate obtained by subjecting to a sealing treatment after a roughening treatment (graining treatment) and an anodizing treatment is preferred. The sealing treatment is preferably conducted by dipping the aluminum substrate in hot water or a hot aqueous solution containing an inorganic or organic salt, or using a steam bath.

The negative-working photosensitive lithographic printing plate of the present invention is produced by applying a solution, which is prepared by dissolving or dispersing the negative-working photosensitive composition in an organic solvent, on the surface of the substrate, and drying the coating film to form a photosensitive layer.

As the organic solvent into which the negative-working photosensitive composition is dissolved or dispersed, publicly known and conventional organic solvents can be used. Among these organic solvents, those having a boiling point within a range from 40 to 200° C., and particularly from 60 to 160° C., are selected in view of convenience during drying.

Examples of the organic solvent include alcohols such as methyl alcohol, ethyl alcohol, n- or iso-propyl alcohol, n- or iso-butyl alcohol, and diacetone alcohol; ketones such as acetone, methyl ethyl ketone, methyl propyl ketone, methyl butyl ketone, methyl amyl ketone, methyl hexyl ketone, diethyl ketone, diisobutyl ketone, cyclohexanone, methylcyclohexanone, and acetylacetone; hydrocarbons such as hexane, cyclohexane, heptane, octane, nonane, decane, benzene, toluene, xylene, and methoxybenzene; acetates such as ethylacetate, n- or iso-propylacetate, n- or iso-butylacetate, ethylbutylacetate, and hexylacetate; halides such as methylene dichloride, ethylene dichloride, and monochlorobenzene; ethers such as iso-propyl ether, n-butyl ether, dioxane, dimethyl dioxane, and tetrahydrofuran; polyhydric alcohols and derivatives thereof, such as ethylene glycol, methylcellosolve, methylcellosolve acetate, ethylcellosolve, diethylcellosolve, cellosolve acetate, butylcellosolve, butylcellosolve acetate, methoxymethoxy ethanol, diethylene glycol monomethyl ether, diethylene glycol dimethyl ether, diethylene glycol methyl ethyl ether, diethylene glycol diethyl ether, propylene glycol, propylene glycol monomethyl ether, propylene glycol monomethyl ether acetate, propylene glycol monoethyl ether, propylene glycol monoethyl ether acetate, propylene glycol monobutyl ether, 3-methyl-3-methoxybutanol, and 1-methoxy-2-propanol; and special solvents such as dimethyl sulfoxide, N,N-dimethylformamide, methyl lactate, and ethyl lactate. These organic solvents are used alone or in combination. The solid content in the negative-working photosensitive composition to be applied is preferably controlled to within a range from 2 to 50% by weight.

As the coating method of the negative-working photosensitive composition, for example, roll coating, dip coating, air knife coating, gravure coating, gravure offset coating, hopper coating, blade coating, wire doctor coating, and spray coating methods are used. The coating weight of the negative-working photosensitive composition is preferably within a range from 10 to 100 ml/m$^2$.

The negative-working photosensitive composition applied on the substrate is usually dried with heated air. The heating temperature is preferably within a range from 30 to 200° C., and particularly preferably from 40 to 140° C. A method of raising the temperature stepwise can also be carried out, in addition to a method of maintaining a constant temperature during drying.

Preferred results can sometimes be obtained by removing moisture in the drying air. The dried air is preferably fed to the coated surface at a rate within a range from 0.1 to 30 m/s, and particularly preferably from 0.5 to 20 m/s.

The coating weight of the photosensitive composition is within a range from about 0.5 to 5 g/m$^2$ in terms of dry weight.

The negative-working photosensitive lithographic printing plate of the present invention can be used as a so-called computer-to-plate (CTP) capable of directly writing an image on a plate based on digital image information from a computer, using a laser.

Examples of the light source of the laser used in the present invention include various semiconductor lasers each having an emission wavelength within a range from 300 nm to 950 nm, carbon dioxide gas lasers (emission wavelength: 10.6 nm), YAG lasers (emission wavelength: 532 nm, 1064 nm), excimer lasers (emission wavelength: 193 nm, 308 nm, 351 nm), and argon lasers (emission wavelength: 488 nm). Any of the lasers can be used by selecting an appropriate pigment or dye from those described above which is capable of absorbing light having the specific wavelength of the light source and converting the light into heat and by adding the pigment or dye to the negative-working photosensitive composition.

In the present invention, since the negative-working photosensitive lithographic printing plate can be handled in a lighted room, a high-output laser having a maximum intensity within a near infrared or infrared range is used most preferably. Examples of the high-output laser having a maximum intensity within a near infrared or infrared range include various lasers having a maximum intensity within a near infrared or infrared range from 760 nm to 3000 nm, for example, a semiconductor laser and YAG laser.

The negative-working photosensitive lithographic printing plate of the present invention is converted into a lithographic printing plate wherein an image portion is formed by writing an image in the photosensitive layer using laser light and developing the image to remove the non-image portion using a wet developing method. An example of the developing solution used in the developing treatment includes an aqueous alkali solution (basic aqueous solution).

Examples of the alkali agent used in the developing solution include an inorganic alkali compound such as sodium silicate, potassium silicate, potassium hydroxide, sodium hydroxide, lithium hydroxide, a sodium, potassium or ammonium salt of secondary or tertiary phosphoric acid, sodium metasilicate, sodium carbonate, or ammonia; and an organic alkali compound such as monomethylamine, dimethylamine, trimethylamine, monoethylamine, diethylamine, triethylamine, monoisopropylamine, diisopropylamine, n-butylamine, di-n-butylamine, monoethanolamine, diethanolamine, triethanolamine, ethyleneimine, or ethylenediamine.

The content of the alkali agent in the developing solution is preferably within a range from 0.005 to 10% by weight, and particularly preferably from 0.05 to 5% by weight. When the content of the alkali agent in the developing solution is less than 0.005% by weight, poor development tends to result. On the other hand, when the content is more than 10% by weight, an adverse influence such as erosion of the image portion upon development is likely to be exerted. Therefore, it is not preferred.

The organic solvent can also be added to the developing solution. Examples of the organic solvent include ethyl acetate, butyl acetate, amyl acetate, benzyl acetate, ethylene glycolmonobutylacetate, butyl lactate, butyl levulinate, methyl ethyl ketone, ethyl butyl ketone, methyl isobutyl ketone, cyclohexanone, ethylene glycol monobutyl ether, ethylene glycol monobenzyl ether, ethylene glycol monophenyl ether, benzyl alcohol, methylphenyl carbitol, n-amyl alcohol, methylamyl alcohol, xylene, methylene dichloride, ethylene dichloride, and monochlorobenzene.

The amount of the organic acid to be added to the developing solution is preferably 20% by weight or less, and particularly preferably 10% by weight or less.

If necessary, the developing solution can contain a water-soluble phosphite such as such as lithium sulfite, sodium sulfite, potassium sulfite, or magnesium sulfite; an aromatic hydroxy compound such as an alkali-soluble pyrazolone compound, alkali-soluble thiol compound, or methyl resorcin; a hard water softening agent such as polyphosphate or aminopolycarboxylate; and various surfactants such as an anionic surfactant (for example, sodium isopropylnaphthalenesulfonate, sodium n-butylnaphthalenesulfonate, sodium N-methyl-N-pentadecylaminoacetate, or sodium lauryl sulfate), cationic surfactant, amphoteric surfactant, and fluorine surfactant, and various defoamers.

As the developing solution, a commercially available developing solution for a negative or positive presensitized (PS) plate can be practically used. Specifically, a solution prepared by diluting a commercially available concentrated developing solution for a negative or positive PS plate by 1 to 1000 times can be used as the developing solution in the present invention.

The temperature of the developing solution is preferably within a range from 15 to 40° C. and the dipping time is preferably within a range from one second to 2 minutes. If necessary, the surface can also be slightly rubbed during the development.

The developed lithographic printing plate is washed with water and/or treated with a water-based desensitizing solution. Examples of the water-based desensitizing agent include an aqueous solution of a water-soluble natural polymer such as gum arabic, dextrin, or carboxymethylcellulose; and a water-soluble synthetic polymer such as polyvinyl alcohol, polyvinyl pyrrolidone, or polyacrylic acid. If necessary, an acid or a surfactant is added to these water-based desensitizing agents. After treating with the desensitizing agent, the lithographic printing plate is dried and then used in printing as a printing plate.

The negative-working photosensitive composition of the present invention can be used for various purposes, such as photoresist, in addition to the lithographic printing plate.

EXAMPLES

The present invention will be described in more detail by way of examples, but the present invention is not limited to these examples.

Example 1

As shown in the formulation of Table 1, 5.0 g of m-cresol novolak resin (N-13P, manufactured by Eastman Kodak Company) as an alkali-soluble resin (a), 3.5 g of a resol resin (bisphenol A type, manufactured by DAINIPPON INK & CHEMICALS, INC., Phenolite ZF-7234) as a compound capable of being crosslinked by an acid (b), 0.6 g of 3-diazo-4-methoxydiphenylamine trifluoromethanesulfonate as a compound capable of generating an acid by heat (c), 0.6 g of a cyanine dye A of the following formula (II) and 0.2 g of a cyanine dye B of the following formula (III) as a photothermal converting agent (d), 0.1 g of diphenyl sulfone as a sulfone compound (e) represented by the general formula (I), 0.1 g of D11 (manufactured by PCAS Co.) as a dye, and 0.6 g of DC190 (10% solution, manufactured by Eastman Kodak Company) as a surfactant were dissolved in a solvent composed of 70.0 g of 1-methoxy-2-propanol and 20.0 g of acetone to prepare a coating solution of a negative-working photosensitive composition.

TABLE 1

| Coating solution of negative-working photosensitive composition, units: g | Examples | | | | | | Comparative Examples | |
|---|---|---|---|---|---|---|---|---|
| | 1 | 2 | 3 | 4 | 5 | 6 | 1 | 2 |
| 1-methoxy-2-propanol | 70.0 | 70.0 | 70.0 | 70.0 | 70.0 | 70.0 | 70.0 | 70.0 |
| Acetone | 20.0 | 20.0 | 20.0 | 20.0 | 20.0 | 20.0 | 20.0 | 20.0 |
| Resol resin (bisphenol A type) | 3.5 | 3.5 | 3.5 | 3.5 | 3.5 | 3.5 | 3.5 | 3.5 |
| m-cresol novolak resin | 5.0 | 5.0 | 5.0 | 5.0 | 5.0 | 5.0 | 5.0 | 5.0 |
| 3-diazo-4-methoxydiphenylamine trifluoromethanesulfonate | 0.6 | 0.6 | 0.6 | 0.6 | 0.6 | 0.6 | 0.6 | 0.6 |
| Cyanine dye A | 0.6 | 0.6 | 0.6 | 0.6 | 0.6 | 0.6 | 0.6 | 0.7 |
| Cyanine dye B | 0.2 | 0.2 | 0.2 | 0.2 | 0.2 | 0.2 | 0.2 | 0.3 |
| D11 | 0.1 | 0.1 | 0.1 | 0.1 | 0.1 | 0.1 | 0.1 | 0.1 |
| DC190 (10% solution) | 0.6 | 0.6 | 0.6 | 0.6 | 0.6 | 0.6 | 0.6 | 0.6 |
| Diphenyl sulfone | 0.1 | 0.3 | 0.5 | — | — | — | — | — |
| Dixylyl sulfone | — | — | — | 0.3 | — | — | — | — |
| Di-n-butyl sulfone | — | — | — | — | 0.3 | — | — | — |
| 4,4'-dichlorodiphenyl sulfone | — | — | — | — | — | 0.3 | — | — |

(II)

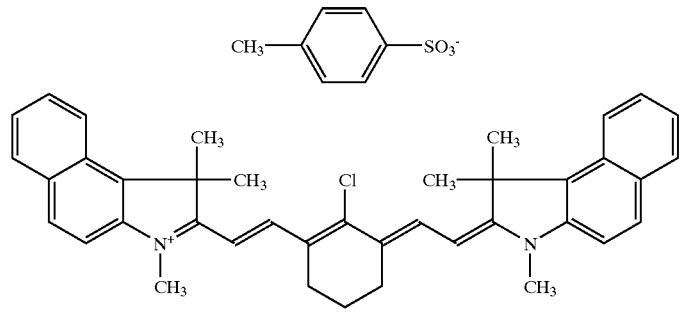

(III)

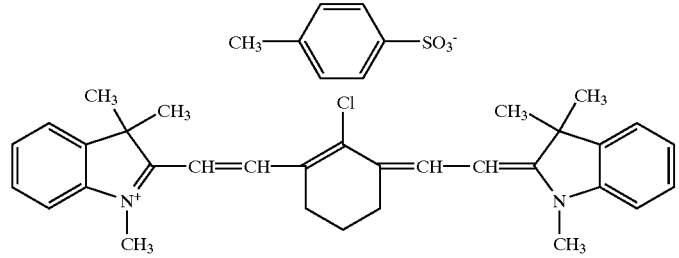

First, an aluminum sheet having a thickness of 0.24 mm was degreased with an aqueous sodium hydroxide and then electrolytically polished in a 20% hydrochloric acid bath to obtain a grained sheet having a center line average roughness (Ra) of 0.5 µm. The resulting grained sheet was anodized in a 20% sulfuric acid bath at a current density of 2 A/dm² to form an oxide film of 2.7 gm², which was washed with water and then dried to obtain an aluminum substrate. On the aluminum substrate, the coating solution of the negative-working photo sensitive composition was applied using a roll coater and dried at 100° C. for 2 minutes to obtain a negative-working photosensitive lithographic printing plate. The weight of the dry coating film was 1.5 g/m².

Using this photosensitive lithographic printing plate, imagewise exposure was conducted by an exposing machine (Trendsetter, manufactured by Creo Corp., wavelength: 830 nm, laser power: 8 W, rotational speed: 140 rpm) equipped with a near infrared semiconductor laser. Using a Wisconsin oven (carrying rate: 2.5 feet/min (0.76 m/min)), preheating was conducted at a specific preheating temperature for one minute, and then a developing treatment was conducted at 30° C. for 25 seconds, using an automatic developing machine (PK-910, manufactured by Kodak Polychrome Graphics) and a developing solution (1:5 diluted solution of PD1R (manufactured by Kodak Polychrome Graphics). The image formability of the lithographic printing plate after the developing treatment was visually evaluated.

In the same manner as described above, a plurality of photosensitive lithographic printing plates were produced and the same evaluation was repeated, except that the preheating temperature was changed. The evaluation results are shown in Table 2. With respect to the evaluation criteria, "A" is good, and the rating becomes poor in the sequence of "B", "C", and "D", and "E" is the most poor.

With respect to the amount of ablation, the entire surface of the resulting ten photosensitive lithographic printing plates (size: 300 mm×500 mm) was exposed to laser light and, after removing the filter, the degree of staining was evaluated. The evaluation results of the amount of ablation are shown in Table 3. With respect to the evaluation criteria, "A" indicates a small amount of ablation and "C" indicates a large amount of ablation.

Examples 2 to 6 and Comparative Examples 1 to 2

In the same manner as in Example 1, except that the formulation of the coating solution was replaced using the formulation as shown in Table 1, negative-working photosensitive lithographic printing plates were produced and evaluated. The evaluation results are shown in Table 2.

TABLE 2

| Preheating temperature | | Examples | | | | | | Comparative Examples | |
|---|---|---|---|---|---|---|---|---|---|
| (°C.) | (°F.) | 1 | 2 | 3 | 4 | 5 | 6 | 1 | 2 |
| 160 | 320 | Staining of non-image portion | Staining of non-image portion | Staining of non-image portion | Staining of non-image portion | Staining of non-image portion | Staining of non-image portion | Staining of non-image portion | Staining of non-image portion |
| 154 | 310 | A | A | A | A | A | A | A | Staining of non-image portion |
| 149 | 300 | B | A | A | A | B | A | B | A |
| 143 | 290 | B | B | A | B | B | B | C | A |
| 138 | 280 | D | C | B | C | C | C | D | B |
| 132 | 270 | E | D | C | D | D | E | E | C |
| 127 | 260 | E | E | D | E | E | E | E | D |

TABLE 3

| | Example | | | | | | Comparative Examples | |
|---|---|---|---|---|---|---|---|---|
| | 1 | 2 | 3 | 4 | 5 | 6 | 1 | 2 |
| Amount of Ablation | A | A | A | A | A | A | A | C |

As is apparent from the results shown in Table 2, regarding the negative-working photosensitive lithographic printing plate having a photosensitive layer made of a negative-working photosensitive composition containing diphenyl sulfone, a preheating temperature where the image can be formed was widened and the preheat latitude was widened.

Also, the temperature range where the image can be formed could be widened by increasing the amount of an IR dye (photothermal converting agent (d)) (Comparative Example 2). However, according to this method, when irradiated with laser light, a dust scattering phenomenon, which is called ablation, became severe and this ablation constitutes a cause for the staining of a laser optical system. On the other hand, in the lithographic printing plates of Examples 1 to 6 using diphenyl sulfone and a derivative thereof, the temperature range where the image can be formed was widened, while the amount of ablation did not change.

What is claimed is:

1. A negative-working photosensitive composition comprising:
   (a) an alkali-soluble resin;
   (b) a compound capable of being crosslinked by an acid;
   (c) a compound capable of generating an acid by heat;
   (d) a photothermal converting agent; and
   (e) a sulfone compound represented by the following general formula (I):

$$R-SO_2-R' \tag{I}$$

wherein R and R' may be the same or different and represent a substituted or unsubstituted alkyl, alkenyl, aryl, or heterocyclic group.

2. The negative-working photosensitive composition of claim 1, wherein the sulfone compound (e) is selected from the group consisting of diphenyl sulfone, dixylyl sulfone, 4,4'-dichlorodiphenyl sulfone, di-n-butyl sulfone, and 2-pyridyltribromomethyl sulfone.

3. The negative-working photosensitive composition of claim 1, wherein the amount of the sulfone compound (e) is within a range from 0.01 to 50% by weight with respect to the solid content of the negative-working photosensitive composition.

4. The negative-working photosensitive composition of claim 1, wherein e alkali-soluble resin (a) is selected from the group consisting of novolak resins, polyhydroxystyrene, acrylic resins containing one or more kinds of monomers having an acidic group and active methylene group-containing resins.

5. The negative-working photosensitive composition of claim 1, wherein the alkaline-soluble resin (a) is a novolak resin.

6. The negative-working photosensitive composition of claim 1, wherein the compound (b) capable of being crosslinked by an acid is selected from the group consisting of melamine derivatives, urea resin derivatives, and resol resins.

7. The negative-working photosensitive composition of claim 1, wherein the compound (c) capable of generating an acid by beat is selected from the group consisting of onium salts, organohalogen compounds, photo acid generating agents having an o-nitrobenzyl protective group, and disulfone compounds.

8. The negative-working photosensitive composition of claim 1, wherein the compound (c) capable of generating an acid by heat is a trihaloalkyl compound or a diazonium salt.

9. The negative-working photosensitive composition of claim 1, wherein the photothermal converting agent (d) is dye which absorbs light within a near infrared or infrared range, selected from the group consisting of cyanine dyes, methine dyes, napthoquinone dyes, and squarilium pigments.

10. An imageable negative-working lithographic printing plate comprising a substrate and a photosensitive layer on a surface of the substrate, the photosensitive layer comprising:
    (a) an alkali-soluble resin;
    (b) a compound capable of being crosslinked by an acid;
    (c) a compound capable of generating an acid by heat;
    (d) a photothermal converting agent; and
    (e) a sulfone compound represented by the following general formula (I):

    R—SO$_2$—R'  (I)

wherein R and R' may be the same or different and represent a substituted or unsubstituted alkyl, alkenyl, aryl, or heterocyclic group.

11. The imageable negative-working lithographic printing plate of claim 10, wherein the weight of the photosensitive layer on the substrate is in a range from about 0.5 to 5 g/m$_2$.

12. The imageable negative-working lithographic printing plate of claim 10, wherein the amount of the sulfone compound (e) is within a range from 0.01 to 50% by weight with respect to the solid content of the photosensitive layer.

13. The imageable negative-working lithographic printing plate of claim 10, wherein the amount of the sulfone compound (e) is within a range from 0.5 to 20% by weight with respect to the solid content of the photosensitive layer.

14. Then negative-working photosensitive composition of claim 1, wherein the amount of the alkali-soluble resin (a) is within a range from 40 to 95% by weight with respect to the solid content of the negative-working photosensitive composition.

15. The negative-working photosensitive composition of claim 1, wherein the amount of the compound (b) capable of being crosslinked by an acid is within a range from 5 to 70% by weight with respect to the solid content of the negative-working photosensitive composition.

16. Then negative-working photosensitive composition of claim 1, wherein the amount of the sulfone compound (e) is within a range from 0.5 to 20% by weight with respect to the solid content of the negative-working photosensitive composition.

17. A method for making an imageable negative-working lithographic printing plate having photosensitive layer on a substrate, comprising:
    a) applying to a surface of the substrate a composition comprising an organic solvent and;
       (i) an alkali-soluble resin;
       (ii) a compound capable of being crosslinked by an acid;
       (iii) a compound capable of generating an acid by heat;
       (iv) a photothermal converting agent; and
       (v) a sulfone compound represented by the following general formula (I):

       R—SO$_2$—R'  (I)

wherein R and R' maybe the same or different and represent a substituted or unsubstituted alkyl, alkenyl, aryl, or heterocyclic group; and
    b) drying the composition to form the photosensitive layer on the surface of the substrate.

18. The method of claim 17, wherein the composition has a solid content in a range from 2 to 50% by weight.

19. The method of claim 17, wherein the composition further comprises a surfactant.

20. The method of claim 19, wherein the surfactant is a fluorosurfactant or silicone-based surfactant.

* * * * *

UNITED STATES PATENT AND TRADEMARK OFFICE
CERTIFICATE OF CORRECTION

PATENT NO. : 6,808,857 B2
DATED : October 26, 2004
INVENTOR(S) : Yasushi Miyamoto et al.

It is certified that error appears in the above-identified patent and that said Letters Patent is hereby corrected as shown below:

Column 14,
Line 58, delete "(c)" and replace it with -- (e) --

Column 15,
Line 10, delete the single word "e" and replace it with -- the --
Line 13, after the word "group" insert a -- , --
Line 34, before the word "dye" insert the word -- a --

Column 16,
Line 11, delete the first word of the sentence "Then" and replace it with -- The --

Signed and Sealed this

First Day of February, 2005

JON W. DUDAS
*Director of the United States Patent and Trademark Office*